United States Patent [19]

Grimm et al.

[11] Patent Number: 4,914,073

[45] Date of Patent: * Apr. 3, 1990

[54] PROCESS FOR THE MANUFACTURE OF CATALYTIC ELEMENTS AND CATALYTIC ELEMENTS SO PRODUCED

[75] Inventors: Daniel Grimm, Bad Schwalbach; Hartmut Kainer, Wiesbaden; Albert Kleinevoss, Höhr-Grenzhausen; Karl-Heinrich Laue, Hattingen; Claus Flockenhaus; Klaus Merkel, both of Essen, all of Fed. Rep. of Germany

[73] Assignees: Didier-Werke AG, Wiesbaden; Didier Engineering GmbH, Essen, both of Fed. Rep. of Germany

[ * ] Notice: The portion of the term of this patent subsequent to May 24, 2005 has been disclaimed.

[21] Appl. No.: 231,702

[22] Filed: Aug. 12, 1988

[30] Foreign Application Priority Data

Aug. 14, 1987 [DE] Fed. Rep. of Germany ....... 3727118

[51] Int. Cl.$^4$ .................. B01J 27/053; B01J 27/185; B01J 27/188; B01J 27/198
[52] U.S. Cl. ..................................... 502/209; 502/210; 502/211; 502/213; 502/217; 502/221; 502/222
[58] Field of Search ............... 502/210, 213, 217, 221, 502/222, 209, 211

[56] References Cited

U.S. PATENT DOCUMENTS 4,695,559 9/1987 Wegener et al. .................. 502/183
4,742,036 5/1988 Flockenhaus et al. ............. 502/183

FOREIGN PATENT DOCUMENTS 3526383 12/1986 Fed. Rep. of Germany .
3505648 2/1987 Fed. Rep. of Germany .
3531651 2/1987 Sweden .............................. 502/213

*Primary Examiner*—W. J. Shine
*Attorney, Agent, or Firm*—Nils H. Ljungman

[57] ABSTRACT

A process for the manufacture of catalysts for the reduction of nitrogen oxides in exhaust gases or for chemical air cleaning processes, in which catalyst moldings are produced from a mixture of solid primary materials which include iron oxide or mixtures of iron oxide and chromium oxide and/or manganese oxide, which are reduced to grain sizes less than 2 mm, with the use of inorganic binders and sulfuric acid, and with the possible addition of activating additives, wherein:

(a) either the mixture of the solid primary materials is reacted with sulfuric acid, a mixture of sulfuric acid and phosphoric acid or mixtures of sulfuric acid and phosphoric acid containing sulfate, hydrogen sulfate, phosphate or hydrogen phosphate of ammonium, aluminum, iron, vanadium, manganese, molybdenum, chromium, copper and/or cobalt, and moldings are formed from this mixture, or the mixture of the solid primary materials is formed into moldings after the addition of fluid and/or phosphoric acid and/or phosphates, and these moldings are treated with sulfuric acid or a sulfuric acid containing sulfate or hydrogen sulfate of ammonium, aluminum, iron, vanadium, manganese, molybdenum, chromium, copper, and (b) then, on the moldings obtained in Step (a), a drying treatment is performed at 110° c. to 250° c., followed by a tempering treatment at 250° C. to 600° c.

The catalysts manufactured using the process described by the invention have a low sensitivity to moisture and good activity.

21 Claims, No Drawings

PROCESS FOR THE MANUFACTURE OF CATALYTIC ELEMENTS AND CATALYTIC ELEMENTS SO PRODUCED

BACKGROUND OF THE INVENTION

1. Field of the Invention

This invention relates to a process for the manufacture of catalysts for the reduction of nitrogen oxides in exhaust gases or for chemical air cleaning processes, in which process catalyst moldings are manufactured from iron oxide or mixtures of iron oxide and chromium oxide and/or manganese oxide, which have been reduced to grain sizes of less than 2 mm, using inorganic binders and sulfuric acid, and possibly using activating additives, and to catalysts manufactured according to the process.

2. Description of the Prior Art

The prior art includes processes for the manufacture of catalysts for the reduction of nitrogen oxides in exhaust gases or for chemical air cleaning processes, whereby in the reduction of nitrogen oxides from exhaust gases, $NH_3$ is added to these exhaust gases for the chemical reaction of the nitrogen oxides with the ammonia, to form nitrogen.

U.S. Pat. No. 4,742,036 issued May 3, 1988 and entitled "Catalyst Plate" describes catalysts for the reduction of nitrogen oxides in exhaust gases, which contain as the principal ingredient a granular $Fe_2O_3$ catalyst material and a binder, whereby this binder is phosphoric acid in a first mixture with the $Fe_2O_3$ and sulfuric acid in a second mixture with $Fe_2O_3$. These two mixtures are mixed with one another, and catalyst plates are manufactured from the resulting mixture.

U.S. Pat. No. 4,695,559, issued Sept. 22, 1987 and entitled "Catalyst for the Selective Reduction of Nitrogen Oxides in Waste Gases and Process for the Manufacture and Use of Such a Catalyst" describes a process for the manufacture of similar catalysts, in which iron oxide and chromium oxide as well as activating additives are mixed dry. This dry mixture is bonded with phosphoric acid, and then saturated with sulfuric acid. A calcining or tempering treatment is conducted and the moldings are then manufactured.

3. Cross-Reference to Copending Applications

U.S. patent application Ser. No. 094,081, filed Sept. 4, 1987, now U.S. Pat. No. 4,806,427, and entitled "Process for the Production of Catalysts for the Reduction of Nitrogen Oxides from Exhaust Gas and Similar Chemicl Air Cleaning Processes" describes a process for the production of catalysts for the reduction of nitrogen oxides in exhaust gases, in which a catalytically active oxide mixture of iron or chromium ore and liquefier is prepared with water and sulfuric acid into a slicker, which is then applied to a metal carrier previously treated with an etching acid.

U.S. patent application Ser. No. 938,518, filed Dec. 5, 1986, now U.S. Pat. No. 4,758,545, and entitled "Process for the Manufacture of Catalyst Moldings from Granular Catalyst Material Such as Iron Ore or Chromium Ore with the Use of a Binder" also describes a process for the manufacture of catalyst moldings of iron, chromium or similar ores, using a binder, whereby the granular primary ores are first subjected to a thermal pretreatment at temperatures from approximately 250° C. to 1000° C., before they are mixed with dilute and/or concentrated sulfuric acid as a binder and reprocessed into catalyst moldings.

U.S. patent application Ser. No. 231,716 entitled "Process for the Manufacture of Catalytic Elements and Catalytic Elements so Produced" was filed on Aug. 12, 1988, which corresponds to German patent application Ser. No. P 37 27 119.9 filed on Aug. 14, 1987, which is entitled in English translation "Process for the Manufacture of Catalysts for the Reduction of Nitrogen Oxides from Waste Gases or for Chemical Air Cleaning Processes, and Catalysts Manufactured According to Said Method".

All of the above-mentioned U.S. Patents and Applications are hereby expressly incorporated by reference as if the contents thereof were set forth in full herein.

OBJECTS OF THE INVENTION

A principal object of the present invention is the provision of a process for the manufacture of catalysts of the type described above, in which catalysts are obtained which have an exceptionally high resistance to moisture and good activity. The problem of moisture resistance in catalysts for the removal of nitrogen oxides from exhaust gases is well known, since when such catalysts are used, the temperature in the exhaust gas can drop below the dew point, thereby causing moisture to be deposited on the catalyst molding. This moisture can either cause disintegration or excessive deformation of the catalyst molding.

SUMMARY OF THE INVENTION

Surprisingly, it has now been found that in the manufacture of such catalysts for the reduction of nitrogen oxides in exhaust gases and for chemical air purification processes, which are generally manufactured from iron oxide or mixtures of iron oxide and chromium oxide and/or manganese oxide, with the addition of activating additives known to the prior art, it is possible to achieve an excellent resistance to moisture, i.e. wet strength, and a good activity, if either the mixture of the solid primary materials is treated with the acid, the acid mixture, or an acid mixture containing a sulfate or phosphate, and then forming the moldings, or if the moldings are produced using only the inorganic and organic binders which may be necessary, and phosphoric acid and/or phosphates, and then treating the moldings with sulfuric acid or a solution containing a sulfate or hydrogen sulfate of ammonium or metals which are soluble in sulfuric acid or dilute sulfuric acid, and then conducting a drying treatment and then a tempering treatment on the moldings obtained.

The good resistance to moisture is obtained by the application of phosphates, either by means of the addition of phosphoric acid and the formation of phosphates, or by the direct addition of phosphates or of phosphoric acid and phosphates into the mixture before molding, either with the simultaneous introduction of sulfuric acid and/or sulfates, or by a subsequent soaking of the moldings in sulfuric acid and/or sulfate solutions. The terms phosphate or sulfate as used herein include hydrogen phosphate and hydrogen sulfate, respectively.

In a preferred embodiment, 10 to 100 wt. % of iron oxid or the mixture of iron oxide and chromium oxide and/or manganese oxide with a grain size below 0.09 mm are used. Particularly active catalysts are obtained in this manner.

In another preferred embodiment of the invention, the activating additives are also used in a grain size below 0.09 mm, whereby the activity of the catalysts obtained is also increased.

In a preferred embodiment, instead of the inorganic binder, or together with the inorganic binder, an organic binder is used, whereby suitable compounds preferably include powder resins, melting adhesives, sinter powder or phenol formaldehyde resins, or modified furfuryl alcohol resins, furan resins, phenol resins, e.g. phenol novolaks and combinations of these compounds.

Preferable inorganic binders include alumina, kaolin and/or aluminaceous compounds, such as aluminum hydroxide or aluminum oxychloride, or compounds containing magnesium or calcium, such as cements, e.g. sorel cements, calcium silicate or calcium aluminate cements, possibly used with fine-grain $SiO_2$, and combinations of these compounds.

In another preferred embodiment, an alumina is used with a concentration of more than 30 wt. % illite.

In another preferred embodiment, 20 to 70 wt. % of iron oxide or a mixture of iron oxide and chromium oxide and/or manganese oxide with a grain size below 0.09 mm is used.

In another preferred embodiment, the oxides of Fe, Cr and/or Mn, any activating additives to be added, and any solid binders to be added are mixed homogeneously with one another before being mixed with the other ingredients, thereby achieving a higher activity of the catalyst moldings produced.

In another preferred embodiment, the activating additives used have a maximum grain size of 0.02 mm.

When sulfuric acid and phosphoric acid are used simultaneously for the production of the catalyst moldings, in the first embodiment, in which the acids are mixed into the initial mixture and then the moldings are produced, salts in the form of sulfates, hydrogen sulfates, phosphates and hydrogen phosphates of metals or ammonium which are soluble in the acid or the acid solution can also be used. In the second embodiment, in which the catalyst moldings are treated after molding with sulfuric acid, together with the sulfuric acid, sulfates or hydrogen sulfates of the type mentioned above can also be used, although they must also be soluble in the sulfuric acid or in the dilute sulfuric acid.

When sulfuric acid and phosphoric acid and their salts are used together, the weight ratio of sulfate to phosphate or hydrogen sulfate to hydrogen phosphates is in the range of 100:1 to 1:100, and preferably in the range from 10:1 to 1:10.

In the process according to the invention, it is essential that, after drying the moldings, a tempering treatment is conducted in the range between 250° C. and 600° C., whereby the indicated temperatures are the maximum temperatures of the tempering treatment. The maximum temperature is preferably in the range between 350° C. and 450° C.

The heating rate during this tempering treatment has a certain effect, and should advantageously be kept between 5° C./h and 200° C./h.

In another preferred embodiment, after the moldings are manufactured and dried and/or hardened, in the embodiment in which an acid treatment is performed after molding, there is a prior treatment with a solution of aluminum hydroxide chloride and a repeated drying before this acid treatment.

In the process according to the invention, the principal components of the catalyst are iron oxide or mixtures of iron oxide and chromium oxide and/or manganese oxide. The terms iron oxide and chromium oxide and manganese oxide as used here also include iron ores, chromium ores and manganese ores respectively with high concentrations of $Fe_2O_3$, $Fe_3O_4$ and $Cr_2O_3$ and manganese oxides. Therefore, the pure oxides need not be used. The oxides or ores are generally added in particles of a suitably small size, e.g. grain sizes less than 2 mm. In the process according to the invention, measured quantities of activating additives are advantageously added to the iron oxide or the mixutre of iron oxide and chromium oxide and/or manganese oxide. These additives can be substances of the prior art, which are added either in the form of elements, oxides or other appropriate salts. Examples of such additive elements are vanadium, copper, cobalt, uranium, tungsten, nickel, molybdenum, manganese, tin, zinc, beryllium, boron, yttrium, niobium, antimony, zirconium, bismuth, silver and rare earth elements in the form of oxides or hydroxides. In catalysts according to the invention, oxides or hydroxides of magnesium, aluminum and silicon can also be present as impurities in the primary materials, or they can be intentionally added.

In the process according to the invention, inorganic and/or organic binders can also be used for the manufacture of the catalyst moldings. Examples of such inorganic binders are alumina, in particular binder alumina, kaolins, aluminaceous compounds such as aluminum hydroxide and aluminum hydroxychloride, or mixtures of these compounds.

The organic binders used in the process according to the invention can be those which are themselves part of the prior art in the field of refractories. Examples of such organic binders are cellulose ether, phenol resins, e.g. phenol novolaks, with the use of appropriate hardeners, e.g. hexamethylenetetramine, as well as modified furan resins, e.g. furfuryl alcohol resins, which are also used with an appropriate hardener, e.g. hexamethylenetetramine.

In addition to the inorganic and/or organic binders, other additives can also be added to the primary mixture for the manufacture of catalyst moldings which can also exert a binding action, or which react with the acids during subsequent treatment and form sulfate or phosphate, which significantly increase the strength of the catalysts ultimately obtained. Examples of such additives are: olivine, talcum, metal hydroxides or carbonates or hydrogen carbonates, e.g. of Mg, Al, Fe, Ca and particulate $SiO_2$.

The process steps for the manufacture of a catalyst according to the invention are themselves part of the prior art. In this process, the primary materials, together with any additives which may be required and the binder, and a possible small amount of a fluid, either water or an organic solvent, such as an alcohol, are mixed into a homogeneous mixture in a suitable mixer. The desired moldings are molded from the mixture, either in a press, isostatically molded, extruded or rolled. The moldings can also be poured.

In the first embodiment of the invention, the fluid to be added consists of sulfuric acid, phosphoric acid, the acid mixture or the sulfate-phospahte-acid mixture.

These green moldings are then either only dried for an accelerated hardening of the bond, e.g. if only inorganic binders are used. Or if a hardening is to be conducted when organic binders are used, they are exposed to a sufficient temperature for the required length of time. Drying when inorganic binders are used is customarily done in the range between 100° C. and 150° C., while when only organic binders are used, or when organic and inorganic binders are used together, the temperature is generally in the range between 150° C. and 250° C.

In the second embodiment of the invention, after the drying or hardening of the moldings, the moldings are subjected to the treatment with sulfuric acid or sulfuric acid containing sulfate or hydrogen sulfate. This treatment can be a dip treatment, i.e. the moldings are immersed in the acid mixture or in the individual acids one after the other, or the acid mixture or the individual acids can be sprayed or brushed onto the moldings. If the moldings are dipped, the immersion time is in general between 3 and 100 seconds, which is a function of the dimensions of the molding, in particular the wall thickness.

Then the moldings treated with the sulfuric acid or the sulfuric acid containing sulfate or hydrogen sulfate are dried, generally between 1 and 4 hours at a temperature between 110° C. and 250° C. After completion of the drying, i.e. the elimination of volatile components, the molding is subjected to a tempering treatment, at a temperature increase rate from 10° C./h to 200° C./h. The moldings are generally held for a certain time, between 2 to 10 hours, at the maximum temperature of the tempering treatment. Then the moldings are allowed to cool, after which they are ready for use. Preferably the tempring is conducted in an atmosphere with a reduced oxygen content, e.g. 0.5–10% oxygen, preferably 2–4% oxygen.

In general, the invention features a process for the manufacture of catalytic elements, the process comprising the steps of:

(a) providing a solid primary material, the solid primary material having grain sizes of less than about 2 mm and the solid primary material being a member chosen from the group consisting essentially of iron oxide, a mixture of iron oxide and chromium oxide, a mixture of iron oxide and manganese oxide, a mixture of iron oxide, chromium oxide and manganese oxide and combinations of members of the group;

(b) treating the solid primary material according to at least one of subprocess I and subprocess II; wherein the subprocess I comprises the steps of:
  (1) acid treating the solid primary material with a member chosen from the group consisting essentially of sulfuric acid, a mixture of sulfuric acid and phosphoric acid and an additional component;
     the additional component being a member chosen from the group consisting essentially of a sulfate of a constituent, a hydrogen sulfate of the constituent, a phosphate of the constituent and a hydrogen phosphate of the constituent;
     the constituent being a member chosen from the group consisting essentially of ammonium, aluminum, iron, vanadium, manganese, molybdenum, chromium, copper, and cobalt; and
  (2) forming the acid treated solid primary material resulting from the (step 1) above to produce catalytic elements; and wherein the subprocess II comprises the steps of:
     (1) forming the solid primary materials to produce catalytic elements; and
     (2) acid treating the catalytic elements with a member chosen from the group consisting essentially of sulfuric acid, sulfuric acid containing a sulphate of a constituent and sulfuric acid containing a hydrogen sulfate of the constituent;
     the constituent being chosen from the group consisting essentially of ammonium, aluminum, iron, vanadium, manganese, molybdenum, chromium, copper, and cobalt;

(c) drying the catalytic elements at a temperature in the range of from about 110° C. to about 250° C.; and (d) tempering the catalytic elements at a temperature in a range from about 250° C. to about 600° C.

DESCRIPTION OF THE PREFERRED EMBODIMENTS

The invention is explained in greater detail by means of the following examples.

EXAMPLE 1

1.95 kg of iron ore comprising 95% $Fe_2O_3$ (remainder $SiO_2$, $Fe_2O_3$ and $Al_2O_3$), the iron ore having a raw density of 3.6 g/cm$^3$, a total porosity of more than 15 vol. % and a grain size of 0.09–1.0 mm, and 0.6 kg of the same iron ore with a grain size of 0–0.09 mm and 0.3 kg of chromium ore with a content of 50% $Cr_2O_3$ (remainder MgO, $SiO_2$, $Fe_2O_3$ and $Al_2O_3$) were homogeneously mixed in a turbulence mixer with 0.15 kg of binder alumina. During mixing, 80 ml of 65% sulfuric acid was sprayed and homogeneously mixed in. From this compound, moldings having the dimensions of 150×150×2.4 mm were pressed under a pressure of 40 N/mm$^3$. These moldings were then dried for 2 hours at 200° C. and heated to 450° C. at a heating rate of 50° C./h. They were held for 5 hours at 450° C. and then allowed to cool.

EXAMPLE 2

The process of Example 1 was repeated. However, initially the iron ore with a grain size between 0–0.09 mm, the binder alumina and 0.125 kg of vanadium pentoxide were intensively mixed in a vibrating ball mill. This premixture was then combined with the other solid substances in the turbulence mixer. The sulfuric acid was added and the moldings were produced as in Example 1.

EXAMPLE 3

0.75 kg of the iron ore used in Example 1 with a grain size of 0.09–0.2 mm, 2.1 kg of the same iron ore with a grain size from 0–0.09 mm, 0.09 kg of binder alumina and 0.12 kg of talcum were combined with 0.15 kg of vanadium pentoxide and 0.09 kg of a cellulose ether, which served as an organic binder and plastifier, in a kneader with 40 ml of 70% phosphoric and 80 ml of 65% sulfuric acid, along with 350 ml of water, and mixed to form a plastic compound. This compound was then rolled into sheets of 150×150×2.4 mm, and moldings with a web-shaped cross section and having the dimensions of 50×50×500 mm were formed by extrusion. These moldings were dried for 24 hours in air and then dried for 24 hours at 110° C. They were then heated to 450° C. at a rate of 20° C./h, held at 450° C. for 5 hours, and then cooled,

EXAMPLES 4 to 17

The primary mixtures of solids described in Examples 1 to 3 were used, and the acid or acid-sulfate-phosphate mixtures described in Table I were added:

TABLE I

| Example | Initial Solids Mixture | |
|---|---|---|
| 4 | 1 | Mixture of 25% sulfuric acid (95%) 25% phosphoric acid (70%) 50% water |
| 5 | 2 | Mixture of 25% sulfuric acid (95%) 25% monoaluminum phosphate (50%) 50% water |
| 6 | 3 | Mixture of 25% sulfuric acid (95%) 5% phosphoric acid (70%) 20% monochromate phosphate solution 50% water |
| 7 | 1 | Mixture of 50% sulfuric acid (95%) 50% water + 2.0% ammonium hydrogen phosphate |
| 8 | 2 | Mixture of 25% sulfuric acid (95) 25% phosphoric acid (70%) 50% water + 1.0% aluminum hydroxide |
| 9 | 3 | Mixture of Example 4 + 4.0% iron (II) sulfate heptahydrate |
| 10 | 1 | Mixture of Example 4 + 4.0% iron (III) sulfate |
| 11 | 1 | Mixture of Example 4 + 5.0% vanadium (IV) oxysulfate pentahydrate |
| 12 | 1 | Mixture of Example 4 + 0.1% nickel oxide |
| 13 | 1 | Mixture of Example 4 + 0.1% molybdenum (VI) oxide |
| 14 | 2 | Mixture of Example 4 + 4.0% aluminum sulfate hydrate |
| 15 | 1 | Mixture of Example 4 + 0.5% manganese (II) sulfate monohydrate |
| 16 | 1 | Mixture of Example 4 + 1.0% iron powder |
| 17 | | Initial mixture of solid substances Mixture of 70% phosphoric acid (85%) 30% water + 4.0% iron (II) sulfate heptahydrate + 4.0% aluminum sulfate hydrate |

EXAMPLE 18

1.95 kg of iron ore with 95% $Fe_2O_3$ (remainder $SiO_2$, FeO and $Al_2O_3$), having a raw density of 3.6 g/cm$^3$ and a total porosity of more than 15 vol. % with a grain size of 0.09–1.0 mm, 0.6 kg of the same iron ore with a grain size of 0–0.09 mm and 0.3 kg of chromium ore with a concentration of 50% $Cr_2O_3$ (remainder MgO, $Fe_2O_3$, $SiO_2$, $Al_2O_3$) were homogeneously mixed in a turbulence mixer with 0.15 kg of binder alumina and 0.06 kg of aluminum hydroxide. Then, 0.3 kg of a modifying furan resin in furfuryl alcohol and 18 g of hexamethylenetetramine were added and homogeneously mixed in. From this mixture, moldings with the dimensions of 150×150×2.4 mm were pressed under a pressure of 40 N/mm$^3$. To dry and harden the bond, the moldings were heated to a temperature of 180° C. for 0.5 h.

EXAMPLE 19

1.95 kg of the iron ore used in Example 18, with a grain size of 0.09–1.0 mm, 0.9 kg of the same iron ore with a grain size of 0–0.09 mm, 0.15 kg of the binder alumina used in Example 18, 0.06 kg of pulverized olivine and 0.06 kg of a pulverized phenol novolak with 9% hexamethylenetetramine were thoroughly mixed in a mixer. Then, 80 ml of water was worked in. Moldings with the dimensions indicated in Example 18 were produced by pressing under the same conditions. These moldings were then dried and hardened under the same conditions indicated in Example 18.

EXAMPLE 20

1.95 kg of the iron ore indicated in Example 18 with a grain size of 0.09–1.0 mm, 0.9 kg of the same iron ore with a grain size of 0–0.09 mm, 0.15 kg of the binder alumina used in Example 18, 0.03 kg of an $SiO_2$-sol and 0.06 kg of a pulverized phenol novolak with 9% hexamethylenetetramine were thoroughly mixed in a mixer. Then, 80 ml of a 10% monoaluminum phosphate solution was worked in. Moldings with the dimensions indicated in Example 18 were produced by pressing under the same conditions. These moldings were then dried and hardened under the conditions indicated in Example 18.

EXAMPLE 21

The operations described in Example 18 were repeated. However, the iron ore with a grain size of 0–0.09 mm had been previously intensively mixed with 0.15 kg of vanadium pentoxide in a vibrating ball mill. This iron ore treated with vanadium pentoxide was then used in the manufacture of the catalyst moldings as described above.

EXAMPLE 22

The operations described in Example 18 were repeated. However, the iron ore with a grain size of 0–0.09 mm had been previously intensively mixed with 0.15 kg of niobium oxide in a vibrating ball mill. This iron ore treated with niobium oxide was then used in the manufacture of the catalyst moldings as described above.

EXAMPLE 23

1.95 kg of the iron ore used in Example 18 with a grain size of 0.09–1.0 mm, 0.9 kg of the same iron ore with a grain size of 0–0.09 mm, 0.15 kg of binder alumina and 0.03 kg of MgO were homogeneously mixed in a mixer. Then, 80 ml of water was added to the mixer. From this mixture, using the process described in Example 18, moldings were produced, which were dried at 120° C. These dried moldings were then immersed for 10 seconds in a 30% solution of aluminum hydroxide chloride and then dried again at 120° C.

EXAMPLE 24

2.1 kg of the iron ore used in Example 18 with a grain size of 0–0.09 mm, 0.75 kg of the same iron ore with a grain size of 0.09–0.2 mm, 0.03 kg of binder alumina and 0.12 kg of talcum, as well as 0.09 kg of a cellulose ether used as an organic binder and plastifier, with 0.015 kg of a pulverized phenol novolak which is a powder resin, with approximately 9% hexamethylenetetramine and 450 ml of water were homogeneously mixed in a kneading mixer to form a plastic compound. The compound was rolled out into sheets having the dimensions of 150×150×2.4 mm, and moldings with the dimensions of 50×50×500 mm with a web-shaped cross section were produced by extrusion. The moldings were dried in air for 24 hours, and then held for 24 hours at 110° C. to remove the water, and for 0.5 hours at 180° C., to harden the organic binder.

EXAMPLE 25

1.5 kg of the iron ore used in Example 18 with a grain size of 0–0.09 mm, 0.75 kg of the same iron ore with a grain size of 0.09–0.2 mm, 0.6 kg of the chromium ore used in Example 18 with a grain size of 0–0.09 mm, 0.03 kg of binder alumina, 0.12 kg of talcum, 0.15 kg of vanadium pentoxide, 0.06 kg of aluminum hydroxide, 0.09 kg of a cellulose ether and 0.15 kg of a modified furan resin with furfuryl alcohol and 9 g of hexamethylenetetramine, along with 400 ml of water, were homogeneously mixed in a kneading mixer to form a plastic compound. The compound was processed and the moldings were dried as in Example 24.

EXAMPLE 26

1.2 kg of the iron ore used in Example 18 with a grain size of 0–0.09 mm, 0.75 kg of the same iron ore with a grain size of 0.09–0.2 mm, 0.9 manganese ore with 30% $MnO_2$, the remainder being $Fe_2O_3$, $Al_2O_3$, $SiO_2$ and CaO, and having a total porosity of more than 30 vol. %, with a grain size of 0–0.09 mm, 0.03 kg of binder alumina, 0.12 kg of talcum, 0.09 kg of a cellulose ether, 0.015 kg of a pulverized phenol novolak with approximately 9% hexamethylenetetramine and 450 ml of water were homogeneously mixed in a kneading mixer to form a plastic compound. The compound was processed and the moldings were dried as in Example 24.

EXAMPLE 27

The catalyst molding manufactured in Example 18 was immersed in an acid bath having the below-identified composition for 15 seconds. Then, the molding was dried for 2 hours at 200° C. and then heated at a temperature increase rate of 10° C./h to 450° C. for the tempering treatment. After a hold time of 5 hours, the molding was cooled to the ambient temperature, and produced a moisture-resistant catalyst with good activity. The tempering treatment was conducted in an atmosphere with 5 vol. % oxygen.

Mixture of:
  50% sulfuric acid (96%)
  50% water

EXAMPLES 28 to 35

The operations described in Example 27 were repeated. The acids described in Example 27 were used, but with the additives listed in Table II:

TABLE II

| Example | |
|---|---|
| 28 | Acid from Ex. 27 + 4.0% iron (II) sulfate heptahydrate. |
| 29 | Acid from Ex. 27 + 4.0% iron (III) sulfate. |
| 30 | Acid from Ex. 27 + 5.0% vanadium (IV) oxysulfate pentahydrate. |
| 31 | Acid from Ex. 27 + 0.1% nickel oxide. |
| 32 | Acid from Ex. 27 + 0.1% molybdenum (VI) oxide. |
| 33 | Acid from Ex. 27 + 4.0% aluminum sulfate hydrate. |
| 34 | Acid from Ex. 27 + 0.5% manganese (II) sulfate monohydrate. |
| 35 | Acid from Ex. 27 + 1.0% iron powder. |

EXAMPLE 36

The catalyst molding produced in Example 19 was saturated with the following mixture:
Mixture of:
  25% sulfuric acid (95%)
  25% monoaluminum phosphate (50%)
  50% water The drying and tempering treatment was done as in Example 27.

EXAMPLE 37

The catalyst molding produced in Example 21 was sprayed with the following mixture, until drops of the mixture ran off its surface:
Mixture of:
  25% sulfuric acid (95%)
  5% phosphoric acid (70%)
  20% monochromium phosphate solution
  50% water The drying and tempering treatment was done as in Example 27.

EXAMPLE 38

The catalyst moldings produced in Example 22 were first saturated in a solution of 50% sulfuric acid, then removed from the sulfuric acid solution, allowed to drip dry, and after 10 minutes were immersed in a 4% aqueous solution of ammonium hydrogen phosphate. They were removed, allowed to drip dry and then dried at 180° C. for 2 hours, and then subjected to the tempering treatment described in Example 27.

EXAMPLE 39

The catalyst molding produced in Example 23 was treated with the following acid solution by immersion:
Mixture of:
  25% sulfuric acid (95%)
  5% phosphoric acid (70%)
  49% water
  +1% aluminum hydroxide.

The drying and tempering treatment was done as in Example 27.

EXAMPLE 40

The molding produced in Example 24 was saturatd with the following solution, and treated as described in Example 27.
Mixture of:
  70% phosphoric (85%)
  30% water
  +4.0% iron (II) sulfate heptahydrate
  +4.0% aluminum sulfate hydrate The catalysts manufactured in the examples have a good resistance to moisture and good activity for the reduction of nitrogen oxides in exhaust gases, with the addition of ammonia.

The moisture resistance of the finished catalyst moldings can be determined by placing the catalyst moldings in a container with water. A moisture resistant molding will retain its shape for at least 24 hours and will retain its strength essentially completely. A molding not resistant to moisture disintegrates in the water in less than 24 hours.

The numbers indicating percents in the parentheses in the examples are preferably concentration percents of the components written therebefore.

In summing up, one aspect of the invention resides broadly in a process for the manufacture of catalysts for the reduction of nitrogen oxides in exhaust gases or for chemical air cleaning processes, in which catalyst moldings are manufactured from iron oxide or mixtures of iron oxide and chromium oxide and/or manganese oxide, which are reduced to grain sizes less than 2 mm, using inorganic binders and sulfuric acid, and possibly activating additives, characterized by the fact that:

(a) either the mixture of the solid primary materials is combined with sulfuric acid, a mixture of sulfuric acid and phosphoric acid, or a mixture of sulfuric acid and phosphoric acid containing sulfate, hydrogen sulfate, phosphate or hydrogen phosphate of ammonium, aluminum, iron, vanadium, manganese, molybdenum, chromium, copper, and/or cobalt, and moldings are produced, or the mixture of the solid primary materials is molded with the addition of fluid and/or phosphoric acid and/or phosphates into moldings, and these moldings are treated with sulfuric acid or a sulfuric acid containing sulfate of hydrogen sulfate of ammonium, aluminum, iron, vanadium, manganese, molybdenum, chromium, copper, and/or cobalt, and (b) then, on the moldings obtained in (Step a), a drying treatment is conducted at 110° to 250° and a tempering treatment at 250° to 600°.

Another aspect of the invention resides broadly in a process characterized by the fact that 10 to 100 wt. % of the iron oxide or the mixture of iron oxide and chromium oxide and/or manganese oxide used has a grain size of less than 0.09 mm.

Yet another aspect of the invention resides broadly in a process characterized by the fact that the activating additives used have a grain size of less than 0.09 mm.

A further aspect of the invention resides broadly in a process characterized by the fact that organic binders are used instead of or together with the inorganic binders.

A yet further aspect of the invention resides broadly in a process characterized by the fact that powder resins, melting adhesives, sinter powder, furan resins, modified furfuryl alcohol resins or phenol formaldehyde resins are used as organic binders.

Yet another further aspect of the invention resides broadly in a process characterized by the fact that alumina, kaolin, aluminaceous compounds such as aluminum hydroxide /or aluminum oxychloride, and/or compounds containing magnesium or calcium, such as cements, possibly with fine-grain $SiO_2$ or a mixture thereof, are used as inorganic binders.

An additional aspect of the invention resides broadly in a process characterized by the fact that olivine, talcum, metal hydroxide or carbonate or hydrogen carbonate of Mg, Al, Fe, Ca and possibly fine-grain $SiO_2$ are used as additives to increase the binding effect.

A yet additional aspect of the invention resides broadly in a process characterized by the fact that the alumina used in an alumina with a content of more than 30 wt. % illite.

A further additional aspect of the invention resides broadly in a process characterized by the fact that 20 to 70 wt. % of the iron oxide or the mixture of iron oxide and chromium oxide and/or manganese oxide used has a grain size of less than 0.09 mm.

A yet further additional aspect of the invention resides broadly in a process characterized by the fact that the iron oxide or the mixture of iron oxide and chromium oxide and/or manganese oxide with a grain size of less than 0.2 mm and preferably less than 0.09 mm, and the activating additives used, as well as the solid binders if any, are mixed homogeneously with one another before being mixed in with the other ingredients.

Another further additional aspect of the invention resides broadly in a process characterized by the fact that the activating additives and the solid binders used have a maximum grain size of 0.02 mm.

A yet further additional aspect of the invention resides broadly in a process characterized by the fact that the acids or salts are used in amounts so that the ratio of $SO_4^{-2}$ to $PO_4^{-3}$, $HSO_4^-$ to $HPO_4^{-2}$, or $HSO_4^-$ to $H_2PO_4^-$ is in the range from 100:1 to 1:100.

Another further additional aspect of the invention resides broadly in a process characterized by the fact that the ratio is in the range from 10:1 to 1:10.

A yet another additional aspect of the invention resides broadly in a process characterized by the fact that the temperature treatment is first conducted at 110° C. to 250° C. as a drying treatment, and after the drying treatment, the temperature treatment is conducted at 250° C. to 600° C. as a tempering treatment.

Another yet further aspect of the invention resides broadly in a process characterized by the fact that the tempering treatment is conducted at a maximum temperature between 350° C. and 450° C.

A still further aspect of the invention resides broadly in a process characterized by the fact that a heating rate between 5° C./h and 200° C./h is maintained during the tempering treatment.

A still further additional aspect of the invention resides broadly in a process characterized by the fact that the tempering treatment is conducted in an atmosphere with a reduced oxygen content, in particular with 0.5–10 vol. % oxygen.

Another still further additional aspect of the invention resides broadly in a process characterized by the fact that the tempering atmosphere has an oxygen content of 2–4 vol. %.

Yet another still further additional aspect of the invention resides broadly in a process characterized by the fact that the moldings, after their manufacture and drying and or hardening, are saturated before the acid treatment with a solution of aluminum hydroxide chloride and then dried once again.

Still another yet further additional aspect of the invention resides broadly in a process characterized by the fact that the moldings are produced by pressing, by isostatic pressing, by extrusion, by rolling or by casting.

Another still further yet additional aspect of the invention resides broadly in a catalyst for the reduction of nitrogen oxides from exhaust gases or for chemical air cleaning processes, produced according to the process described above.

The invention as described hereinabove in the context of a preferred embodiment is not to be taken as limited to all of the provided details thereof, since modifications and variations thereof may be made without departing from the spirit and scope of the invention.

What is claimed is:

1. A process for the manufacture of catalytic elements, said process comprising the steps of:
  (a) providing a solid primary material, said solid primary material being a member selected from the group consisting essentially of iron oxide, a mixture of iron oxide and chromium oxide, a mixture of iron oxide and manganese oxide, a mixture of iron oxide, chromium oxide and manganese oxide and combinations of members of the group;
  (b) treating said solid primary material according to at least one of subprocess I and subprocess II; wherein said subprocess I comprises the steps of:
    (1) acid treating said solid primary material with a member selected from the group consisting essentially of:
      (a) sulfuric acid;
      (b) a mixture of sulfuric acid and phosphoric acid;

(c) a mixture of sulphuric acid and an additional component; and
(d) a mixture of sulphuric acid and phosphoric acid containing an additional component;
said additional component being a member selected from the group consisting essentially of a sulfate of a constituent, a hydrogen sulfate of said constituent, a phosphate of said constituent and a hydrogen phosphate of said constituent;
said constituent being a member selected from the group consisting essentially of ammonium, aluminum, iron, vanadium, manganese, molybdenum, chromium, copper, and cobalt, and
(2) producing a catalytic element from said acid treated solid primary material resulting from said step (1) above and wherein said subprocess II comprises the steps of:
(1) producing catalytic elements from said solid primary materials; and
(2) acid treating said catalytic elements with a member selected from the group consisting essentially of sulfuric acid, sulfuric acid containing a sulphate of a constituent and sulfuric acid containing a hydrogen sulfate of said constituent;
said constituent being selected from the group consisting essentially of ammonium, aluminum, iron, vanadium, manganese, molybdenum, chromium, copper, and cobalt;
(c) drying said catalytic elements at a temperature in the range of from about 110° C. to about 250° C.; and
(d) tempering said catalytic elements at a temperature in a range from about 250° C. to about 600° C.

2. A process for the manufacture of catalytic elements according to claim 1, wherein, in said subprocess II, prior to said forming step (1), an additional component is added to said solid primary material, said additional component comprising a fluid selected from the group consisting essentially of/water and an organic solvent.

3. A process for the manufacture of catalytic elements according to claim 1, wherein from about 10 to about 100 wt. % of said solid primary material has a grain size of less than about 0.09 mm.

4. A process for the manufacture of catalytic elements according to claim 1, further comprising the step of combining at least one activating additive with said solid primary material, said at least one activating additive having a grain size of less than about 0.09 mm.

5. A process for the manufacture of catalytic elements according to claim 1, further comprising the step of combining with said solid primary material a binder selected from the group consisting essentially of an organic binder, an inorganic binder and a combination of the members of the group.

6. A process for the manufacture of catalytic elements according to claim 5, wherein said organic binder is a member selected from the group consisting essentially of powder resins, furan resins, modified furfuryl alcohol resins, phenol formaldehyde resins and combinations of members of the group.

7. A process for the manufacture of catalytic elements according to claim 5, wherein said inorganic binder is a member selected from the group consisting essentially of alumina, kaolin, aluminaceous compounds, magnesium compounds, calcium compounds, cements, fine-grained $SiO_2$ and combinations of members of the group.

8. A process for the manufacture of catalytic elements according to claim 7, further comprising the step of mixing with said solid primary material a further additive for increasing the binding effect of said inorganic binder, said further additive being a member selected from the group consisting essentially of olivine, talcum, fine-grained $SiO_2$ and a member selected from the group consisting essentially of a hydroxide of an additional constituent, a carbonate of said additional constituent and a hydrogen carbonate of said additional constituent, said additional constituent being a member selected from the group consisting essentially of magnesium, aluminum, iron and calcium.

9. A process for the manufacture of catalytic elements according to claim 7, wherein said alumina has a content of illite of greater than 30 wt. %.

10. A process for the manufacture of catalytic elements according to claim 1, wherein between about 20 and about 70 wt. % of said solid primary material has a grain size of less than about 0.09 mm.

11. A process for the manufacture of catalytic elements according to claim 5, further comprising the step of mixing an activating additive homogenously together with said solid primary material and said binder prior to the addition of any further components, said activating additive having a grain size of less than about 0.2 mm.

12. A process for the manufacture of catalytic elements according to claim 11, wherein said activating additive has a grain size of less than about 0.09 mm.

13. A process for the manufacture of catalytic elements according to claim 2, wherein said acid treatment of said step (b) results in at least one of the ratios of:
$SO_4^{-2}$ to $PO_4^{-3}$;
$HSO_4^-$ to $HPO_4^{-2}$; and
$HSO_4^-$ to $H_2PO_4$;
being within a range of from about 100:1 to about 1:100.

14. A process for the manufacture of catalytic elements according to claim 13, wherein at least one of said ratios lies within a range of from about 10:1 to about 1:10.

15. A process for the manufacture of catalytic elements according to claim 1, wherein said tempering treatment of said step (d) is conducted at a maximum temperature of between about 350° C. and about 450° C.

16. A process for the manufacture of catalytic elements according to claim 1, wherein, during said tempering treatment of said step (d), the temperature to which said catalytic elements are subjected is increased at a rate of between about 5° C./hour and about 200° C./hour.

17. A process for the manufacture of catalytic elements according to claim 1, wherein said tempering treatment of said step (d) is carried out in an oxygen reduced atmoshpere having between about 0.5 and about 10 vol. % oxygen.

18. A process for the manufacture of catalytic elements according to claim 17, wherein said oxygen reduced atmosphere has an oxygen content of between about 2 and about 4 vol. %.

19. A process for the manufacture of catalytic elements according to claim 1, said process comprising the additional steps of, prior to said acid treatment of said step (b), drying catalytic elements, saturating said catalytic elements with a solution comprising aluminum hydroxide chloride, and again drying said catalytic elements.

20. A process for the manufacture of catalytic elements according to claim 1, wherein said forming of said step (b) comprises a forming step selected from the group of forming processes consisting essentially of pressing, isostatic pressing, extrusion, rolling and casting.

21. A catalyst for the reduction of nitrogen oxides in a gas manufactured according to the process of claim 1.

* * * * *

UNITED STATES PATENT AND TRADEMARK OFFICE
CERTIFICATE OF CORRECTION

PATENT NO. : 4,914,073

DATED : April 3, 1990

INVENTOR(S) : Daniel GRIMM, et al

It is certified that error appears in the above-identified patent and that said Letters Patent is hereby corrected as shown below:

In column 1, lines 50-51, delete "Chemicl", and insert --Chemical--.

In column 4, line 11, delete "mixutre", and insert --mixture--.

In column 4, line 62, delete "sulfate-phospahte-acid", and insert --sulfate-phosphate-acid--.

In column 10, line 36, delete "saturatd", and insert --saturated--.

In column 11, line 47, delete "in", and insert --is--.

In Claim 2, line 40, after "of", delete "/".

In Claim 13, line 30, delete "$HSO_4^-$ to $HPO_4^{312}$; and", and insert --$HSO_4^-$ to $HPO_4^{-2}$; and--.

In Claim 13, line 31, delete "$HSO_4^{31}$ to $H_2PO_4$;" and insert --$HSO_4^-$ to $H_2PO_4$;--.

Signed and Sealed this

Sixth Day of August, 1991

*Attest:*

HARRY F. MANBECK, JR.

*Attesting Officer*   *Commissioner of Patents and Trademarks*